US012609497B2

(12) United States Patent
Söhnel et al.

(10) Patent No.: US 12,609,497 B2
(45) Date of Patent: Apr. 21, 2026

(54) INTEGRATED MODULE FOR AN APPARATUS FROM LIGHTING, SOUND, VIDEO OR SPECIAL EFFECTS ENGINEERING FOR PROVIDING CONTROL BY MEANS OF AN ETHERNET CONNECTION

(71) Applicant: Neutrik AG, Schaan (LI)

(72) Inventors: Christian Söhnel, Göfis (AT); Florian Burtscher, Schlins (AT)

(73) Assignee: Neutrik AG, Schaan (LI)

( * ) Notice: Subject to any disclaimer, the term of this patent is extended or adjusted under 35 U.S.C. 154(b) by 385 days.

(21) Appl. No.: 18/512,397

(22) Filed: Nov. 17, 2023

(65) Prior Publication Data

US 2025/0023306 A1 Jan. 16, 2025

(30) Foreign Application Priority Data

Jul. 14, 2023 (EP) .................................... 23185602

(51) Int. Cl.
*H01R 24/64* (2011.01)

(52) U.S. Cl.
CPC ......... *H01R 24/64* (2013.01); *H01R 2201/04* (2013.01); *H01R 2201/18* (2013.01)

(58) Field of Classification Search
None
See application file for complete search history.

(56) References Cited

U.S. PATENT DOCUMENTS

| | | | | |
|---|---|---|---|---|
| 7,852,873 | B2 * | 12/2010 | Bird | H04L 41/24 709/223 |
| 9,801,262 | B1 | 10/2017 | Helms | |
| 11,269,800 | B2 * | 3/2022 | Franke | G06F 13/4282 |
| 2013/0286896 | A1 * | 10/2013 | Selph | H04Q 1/136 439/651 |
| 2016/0227629 | A1 | 8/2016 | Conner et al. | |

FOREIGN PATENT DOCUMENTS

| | | | |
|---|---|---|---|
| CN | 113852529 | B | 3/2023 |
| EP | 2421100 | B1 | 3/2016 |
| JP | 2022147202 | A | 10/2022 |
| JP | 2022147204 | A | 10/2022 |
| WO | 2021219541 | A1 | 11/2021 |

* cited by examiner

*Primary Examiner* — Tho D Ta
(74) *Attorney, Agent, or Firm* — Volpe Koenig

(57) ABSTRACT

An ethernet device connector built-in module for a controllable apparatus from lighting, sound, video or special effects engineering, for incorporating the apparatus in a chain of apparatuses serially connected by ethernet. The construction of the built-in module allows serial control of complexly switchable apparatuses. The built-in module provides a data supply and, for example, a power supply of a chain of serially interconnected apparatuses via two external plug-in locations being interconnected via an interposed distributor component that has an ethernet contact interface on a PCB of the built-in module for connecting within the apparatus, the built-in module to control electronics of the apparatus. The distributor component is configured here to distribute a data supply signal and optionally a power supply signal supplied by one of the two external plug-in locations to the other one of the two external plug-in locations and the ethernet contact interface on the PCB.

15 Claims, 5 Drawing Sheets

INTEGRATED MODULE FOR AN APPARATUS FROM LIGHTING, SOUND, VIDEO OR SPECIAL EFFECTS ENGINEERING FOR PROVIDING CONTROL BY MEANS OF AN ETHERNET CONNECTION

CROSS-REFERENCE TO RELATED APPLICATIONS

This application claims priority from European Patent Application No. 23185602.2, filed Jul. 14, 2023, which is incorporated herein by reference as if fully set forth.

TECHNICAL FIELD

The present invention relates to an ethernet device connector built-in module for a switchable apparatus from lighting, sound, video or special effects engineering, in particular for incorporating the apparatus in a chain of a plurality of apparatuses serially connected.

BACKGROUND

Apparatuses from lighting, sound, video or special effects engineering, for example in the form of electrical and electronic devices and installations, play a central role in the staging of events, for example stage or theatre performances, film and television productions, exhibitions and concerts.

Lighting engineering comprises technical measures for influencing the light conditions, for example in order to create an impressive variable set design and effectively accentuate the presented mood. Switchable apparatuses in lighting engineering comprise for example illumination units such as spot lamps, luminaires, lasers and LED panels, which are often connected to one another in a chain. Typically, the illumination units are part of a programmable illumination system for adaptive, for example scene-dependent, illumination. The adaptive illumination is typically provided by an illumination controller—for example operable by way of what is known as a control panel-which controls the operating states (e.g., switching on or off, colour selection, intensity) of the various illumination units (e.g., stage spotlights).

Sound engineering comprises technical devices for converting, processing, recording and reproducing acoustic signals. Switchable apparatuses in sound engineering for example comprise amplifiers and loudspeakers, microphones, tone controllers and equipment for creating a specific acoustic effect, for example reverberation equipment. Video engineering comprises technical devices for visually displaying images, for example projectors and screens, and for processing and recording image or video data. The various electrical signals (e.g., audio, video) are combined and controlled by way of what is known as a mixer, for example.

Special effects engineering comprises technical devices for creating special effects using physical or chemical processes. Frequently employed special effects devices include for example fog, smoke or wind machines. Further configurations for example comprise pyrotechnic devices or devices for creating scent elements.

Various apparatuses from lighting, sound, video and special effects engineering can for example be controlled, individually in each case, by a central distributor (a so-called hub). This type of installation and control is frequently used for fixed installations.

Further, the apparatuses can also be connected in the form of a chain of a plurality of serially connected apparatuses and controlled thus. By way of example, this is also referred to as "daisy chaining". In this case, the first apparatus is directly connected to a computing unit, for example to a computer or bus. The further apparatuses are each connected in a series connection to the preceding and subsequent apparatus, with the result that the signal transfer to and from each apparatus is provided via its predecessors to the computing unit. The serial connection of a plurality of apparatuses is for example frequently used for temporary constructions (e.g., concerts, events or exhibitions), since this can reduce the number of cables.

In addition to the frequent unplugging and renewed plugging of the connectors, for example in the case of touring stage productions, the connectors for supplying apparatuses with power and for connecting the apparatuses to the apparatus controller are frequently exposed to significant mechanical loads, even during operation. For example, significant time pressures and the desired flexibility during stage performances often leads to a heavy-handed treatment of the equipment by the artists and the stagehands. For example, stagehands supporting themselves on housings of already plugged cable connectors or pulling at connection cables is not an unusual occurrence. Typically, cable connectors are therefore specially designed to be resistant to mechanical action and ambient influences, both in the plugged and unplugged state. Moreover, the plugs are often locked against inadvertent removal.

The apparatuses are typically controlled by means of analogue connections for receiving a command signal and optionally an additional power supply signal. For example, what are known as XLR connectors (also referred to as Cannon connectors) are used to this end. XLR plugs are standardized in the international standard IEC 61076-2-103, wherein XLR plugs in a 3, 4 and 5-pin embodiment are able not only to provide data transfer but also to supply voltage to terminals.

For example, what is known as a DMX ("digital multiplex") protocol for five-pin XLR connectors is often used to control lighting engineering and special effects devices.

XLR connectors for example enable the supply of a chain of serially connected apparatuses with power and the transfer of up to 512 or 1024 different control channels. However, in the case of complexly switchable apparatuses, for example stage spotlights or LED panels with a plurality of different dim and colour settings, and/or when a great number of serially connected apparatuses is used, the options for data and current transfer by means of XLR connectors is limited on account of the number of control channels being too small for this purpose.

SUMMARY

It is therefore an object of the invention to provide an improved control of a switchable apparatus from lighting, sound, video or special effects engineering.

A special object consists of providing an improved control of a chain of a multiplicity of serially connected apparatuses from lighting, sound, video or special effects engineering.

A further object consists of providing a simple-to-implement upgrade of conventional apparatuses from lighting, sound, video or special effects engineering, in respect of an improved control of the apparatuses for an incorporation of said apparatuses in a chain of a plurality of serially connected apparatuses.

These objects are achieved by the implementation of at least some of the features disclosed herein. Features that develop the invention in alternative or advantageous fashion can be gathered from following description and claims.

According to the invention, relatively complex controls are provided by means of signal transfer and optional power supply via ethernet. The power supply via ethernet makes it possible to supply a network-capable device with power via the ethernet cable and at the same time provide network connectivity over the same ethernet cable. Thus, for example, data and current for the power supply can be transferred together to the apparatus via a cable. This enables the serial connection of a multiplicity of apparatuses, which are each configured for complex switching for the purpose of controlling/adapting the operating state of the apparatus.

The invention relates to an ethernet device connector built-in module for a controllable apparatus from lighting, sound, video or special effects engineering, configured to be installed into the said apparatus as a pre-manufactured physical component. The built-in module comprises a fastening provision for providing an installation of the ethernet device connector built-in module on a housing of the apparatus, for example drilled holes each provided to accommodate fastening means, such as screws and pins, for fastening the ethernet device connector built-in module to the housing of the apparatus. Further, the ethernet device connector built-in module comprises a double device connector which has two external plug-in locations provided by a common flange element and each serving—when the ethernet device connector built-in module is in the installed state in the apparatus—to plug in an ethernet cable connector in order to incorporate the apparatus in a chain of a plurality of apparatuses serially connected by ethernet. A distributor component arranged on a printed circuit board of the ethernet device connector built-in module is configured to distribute a data signal supplied by one of the two external plug-in locations to the other one of the two external plug-in locations and to an ethernet contact interface on the printed circuit board. In particular, the distributor component can also be configured to distribute a data supply signal and a power supply signal supplied by one of the two external plug-in locations to the other one of the two external plug-in locations and the ethernet contact interface on the printed circuit board.

The distributor component is connected via conductor tracks on the printed circuit board to the ethernet contact interface, the ethernet contact interface having mechanically contactable contacts, or contacts contactable by soldering, that serve the connection, in the interior of the apparatus, of the printed circuit board to control electronics of the apparatus for controlling (i.e., transferring the data signal and in particular for supplying power to) the apparatus.

Lighting, sound, video and special effects engineering in each case refers to technical devices as described at the outset. For example, the ethernet device connector built-in module is configured to be installed in an illumination unit (e.g., controllable by DMX) such as a spotlight, a laser, or an LED panel; an audio device (e.g., based on Dante technology) such as an active loudspeaker or an audio recorder; a video device (e.g., based on Dante technology) such as a video wall (e.g., LED wall), a video recorder or else a video processing device; or a special effects device such as a smoke, fog or wind machine.

For example, the external plug-in locations, the ethernet contact interface on the printed circuit board and the distributor component are designed for operation according to PoE or PoDL technology.

The abbreviation PoE refers to "power over ethernet" and relates to methods by which network-capable devices can be supplied with power via the eight-core ethernet cable. In addition to the respectively backward compatible variants standardized by IEEE 802.3, there are a few proprietary methods and simple, passive variants.

The abbreviations SPE and PoDL mean "single pair ethernet" and "power over data line", respectively, and describe ethernet-based data and current transfer via only one twisted core pair. Existing SPE and PoDL solutions are likewise standardized in IEEE 802.3. While PoE technology uses at least two or even four core pairs, the SPE or PoDL technology allows the transmission of electrical energy by only a single core pair. For instance, two-core cables pursuant to IEC 61156 are suitable for PODL.

In an embodiment, the external plug-in locations, the ethernet contact interface on the printed circuit board and the distributor component are configured for operation according to one of the IEEE standards 802.3, for example 802.3, 802.3af, 802.3at, 802.3bt, 802.3bu.

In a further embodiment, the external plug-in locations, the ethernet contact interface on the printed circuit board and the distributor component are configured for operation according to an ethernet protocol which provides for a control (i.e., data signal transfer and in particular power supply) of different types of apparatuses.

In this case, in particular, one of the different types is a first type of apparatus from one of the four fields of lighting, sound, video and special effects engineering and a further type of the different types is a second type of apparatus from a field of the four fields of lighting, sound, video and special effects engineering which differs from the first field. In other words, the ethernet protocol provides connectivity between at least two (different) fields of the four fields of lighting, sound, video and special effects engineering. By way of example, the ethernet protocol is configured to provide integration and control of one or more active loudspeakers and one or more spotlights in the same daisy chain.

In a further embodiment, the external plug-in locations each comprise an RJ45 or SPE jack.

An/8-pin plug much used in the art is known as an "RJ45" plug. In some applications, the standardized RJ45 plug is susceptible to damage and outages. For example, it is not well-suited to being repeatedly plugged in and out since the contacts are easily bent or displaced as a result of an incorrect insertion. The plastic latch (spring arm) may fatigue and break off, with the result that the plug is then no longer securely seated in the jack. The cable itself is susceptible to faults as a result of repeatedly bending at the point where the cable enters the jack. Additionally, the cable can also be pulled from the plug as a result of a longitudinal load. The plug housing is shaped from plastic and easily deformed or broken, for example if inadvertently stepped on. The aforementioned disadvantages also apply to other cabled connections, for example optical waveguides, power cables and many more.

In the scope of stage and events technology, or else in other sectors where connectors are exposed to rough conditions, for example in the outdoor or military sector, use is therefore made of specifically designed cable and device connector arrangements which for example protect the sensitive RJ45 cable and device connections or generally protect the contact elements (e.g., in the case of proprietary designs). For example, a cable plug protector for pre-assembled RJ45 cable plugs is made commercially available under the trade name NE8MC by Neutrik Group By way of example, cable connectors used within the sense of the invention comprise a housing, a radially compressible tensioning piece, and a bend protection. The housing is often configured so that a mechanically lockable plug-in connection is provided between plug-in location and a cable connector which is matched to the plug-in location as a mating piece and insertable into a plug-in opening in the housing of the plug-in location. The tensioning piece is accommodated in the interior of the housing and fixed to the housing against axial tension (along the cable), wherein the radially compressible tensioning piece engages around the cable and, in the pressed-together state, clamps the cables securely in the housing. This structure obtains a tension-relieving effect on a cable connected to the cable connector or plug-in location. For example, the tensioning piece comprises a radially compressible tensioning sleeve, which is radially compressed by means of a union nut or clamping nut. The bend protection is attached in the back region (toward the cable, away from the plug-in opening) on the housing of the cable connector and stabilizes the cable such that the risk of the cable kinking is minimized. For example, the bend protection is designed as a reinforcement made of a stiff rubber or plastic material, which encloses the cable.

In a further embodiment, the plug-in locations are each configured to establish a precisely fitting mechanically lockable plug-in connection with a respective cable connector which is adapted to the plug-in location as a mating piece and insertable into a plug-in opening in a housing of the respective plug-in location. Here, the plug-in locations each have a jack arranged in the respective housing, with a front portion of the housing-a portion facing a side from which the cable connector can be brought to the respective plug-in opening-surrounds at least one portion of the jack at a distance.

In a further embodiment, the ethernet contact interface on the printed circuit board comprises an RJ45 or SPE plug, for example wherein the RJ45 or SPE plug is connected to the printed circuit board with a cable. For example, this is advantageous if the apparatus already has a corresponding mating input piece.

Alternatively, the printed circuit board is configured to be plugged into a control unit (e.g., a PCB) of the apparatus and is connected to the external plug-in locations via a cable, for example an FCC or FPC cable (FCC: Flexible Flat Cable, FPC: Flexible Print Cable).

In a further alternative, the ethernet device connector built-in module comprises a PCB plug-in module (PCB: Printed Circuit Board) which is connected to the ethernet contact interface on the printed circuit board via a cable, for example an FCC or an FPC cable, and is designed to be plugged into a control unit (e.g., a PCB) of the apparatus.

In a rudimentary configuration, the ethernet contact interface on the printed circuit board is merely provided in the form of contacts, for example pins, solder spots or cable ends, which are to be connected (e.g., soldered or clamped) to a control unit of the apparatus. In contrast to the conductor tracks, which for example have widths in the submillimetre range (frequently used tracks have a width of 35 μm), the contacts are dimensioned such that they enable manual mechanical or solder-type contacting of the contacts. For example, the contacts extend at least 1 or 2 millimetres in one spatial direction.

In a further embodiment, the ethernet device connector built-in module comprises a front side configured to constitute a part of the housing exterior of the housing of the apparatus when the ethernet device connector built-in module is in the installed state in the apparatus, with a respective plug-in opening for receiving a cable connector that is insertable into the respective external plug-in location being arranged at this front side for each of the two external plug-in locations. By way of example, the front side of the ethernet device connector built-in module is matched in terms of shape and size to an installation opening for the ethernet device connector built-in module on the apparatus, with the result that the front side (e.g., seamlessly) continues the housing exterior of the housing of the apparatus after the installation.

The common mounting plate has the fastening provision, for example in the form of drilled holes for receiving fastening means for fastening, for example screwing, the mounting plate to the housing of the apparatus.

In a further embodiment, the common flange element of the double device connector is configured to provide the mounting plate of the ethernet device connector built-in module. Thus, the common flange element may have the required shape in order to for example be accommodated in a housing opening in the apparatus such that an outer side of the flange element after the installation into the housing opening continues to shape the housing exterior of the housing of the apparatus correctly in accordance with the remaining shape of the apparatus.

In a further embodiment, contact elements of one of the two external plug-in locations are connected in the interior of the module (i.e., within the ethernet device connector built-in module) to a signal input of the distributor component. Further, a first signal output of the distributor component, which differs from the signal input, is connected in the interior of the module to contact elements of the other one of the two external plug-in locations and a second signal output of the distributor component, which differs from the signal input and from the first signal output, is connected in the interior of the module to the ethernet contact interface on the printed circuit board.

In a further embodiment, the ethernet device connector built-in module comprises a power supply unit connected to the distributor component and serving to receive a current input signal and provide a current output signal for supplying the distributor component with power. For example, the ethernet device connector built-in module comprises a separate current connector interface connected to the power supply unit and serving to connect to an external power supply for supplying the power supply unit with the current input signal. Alternatively, or else in combination with the separate current connector interface, the external plug-in location of the two that is connected in the interior of the module to the signal input of the distributor component is further connected to the power supply unit and configured such that an input signal supplied via the one of the two external plug-in locations is split into a data signal component providing data transmission and a power supply signal component providing a power supply of the power supply unit, with the power supply signal component being supplied to the power supply unit and the data signal component being supplied to the signal input of the distributor component.

BRIEF DESCRIPTION OF THE DRAWINGS

The ethernet device connector built-in module according to the invention is explained in more detail but purely by way of example below on the basis of the exemplary embodiments schematically illustrated in the figures. In the figures, the same elements are denoted by the same reference signs. As a rule, the described embodiments are not depicted true to scale and should not be construed as limiting either. In detail

DETAILED DESCRIPTION

Figure 1:
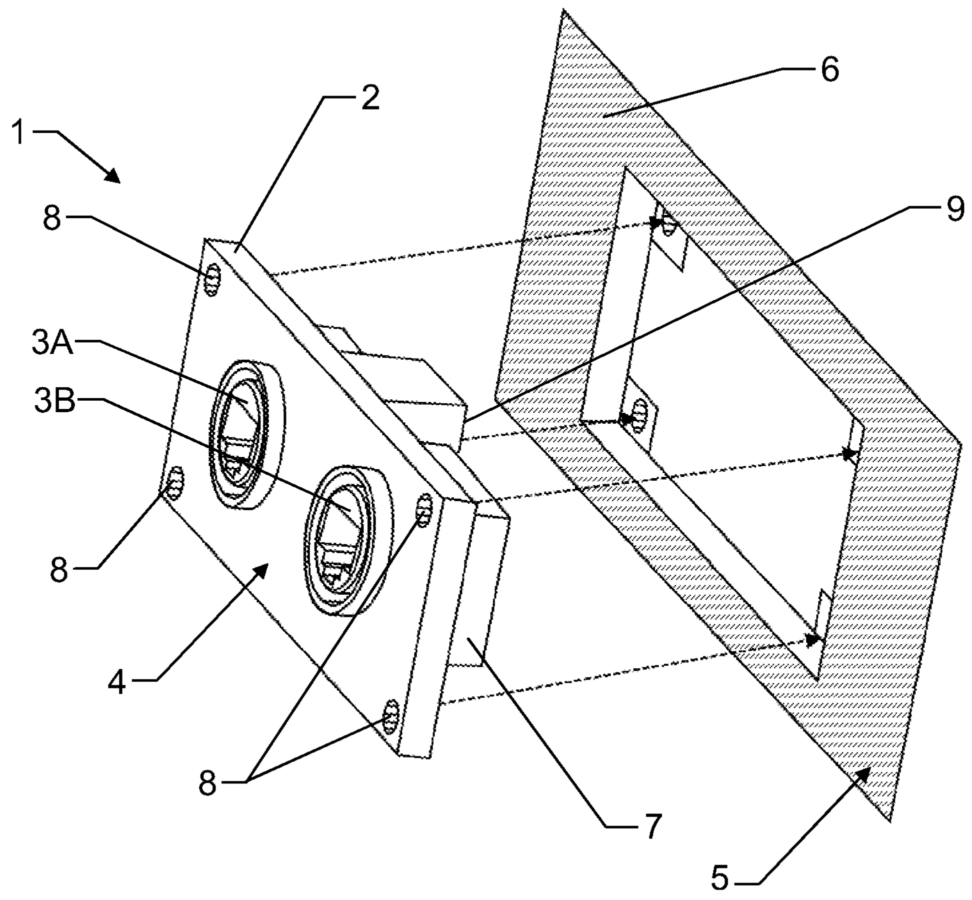
FIG. 1: shows an exemplary embodiment of an ethernet device connector built-in module according to the invention.

FIG. 1 shows an exemplary embodiment of an ethernet device connector built-in module 1 according to the invention. The ethernet device connector built-in module 1 comprises a double device connector 2 which provides two external plug-in locations 3A, 3B. In the example shown, a flange element of the double device connector 2 provides a common mounting plate of the ethernet device connector built-in module 1 and is configured such that an external side 4 of the flange element in the state where it is installed in the apparatus forms a part of a housing exterior 5 of the housing 6. The ethernet device connector built-in module 1 also has further housing parts 7 which, following the installation of the built-in module 1 into the apparatus, are arranged in the interior of the apparatus. As fastening provision, the flange element of the double device connector 2 has drilled holes 8 for screwing the flange element to the housing 6 of the apparatus.

In the example shown, the flange element/mounting plate is matched in terms of shape and size to an installation opening for the ethernet device connector built-in module on the housing 6 of the apparatus, with the result that the external side 4 of the flange element/mounting plate (front side of the ethernet device connector built-in module) seamlessly continues the housing exterior 5 of the housing 6 of the apparatus following the installation.

The two external plug-in locations 3A, 3B are connected to an ethernet contact interface 9 on a printed circuit board of the ethernet device connector built-in module 1, said ethernet contact interface providing an internal ethernet output interface for connecting, in the interior of the apparatus, the ethernet device connector built-in module 1 to control electronics of the apparatus for controlling the apparatus. A distributor component (not shown; see FIG. 2) configured to distribute a data and power supply signal supplied via one of the two external plug-in locations 3A, 3B to the other one of the two external plug-in locations 3A, 3B and to the internal ethernet contact interface 9 is interposed between the two external plug-in locations 3A, 3B and the (internal) ethernet contact interface 9 on the printed circuit board. By way of example, the distributor component is designed as a PoE or PoDL switch.

Figure 2:
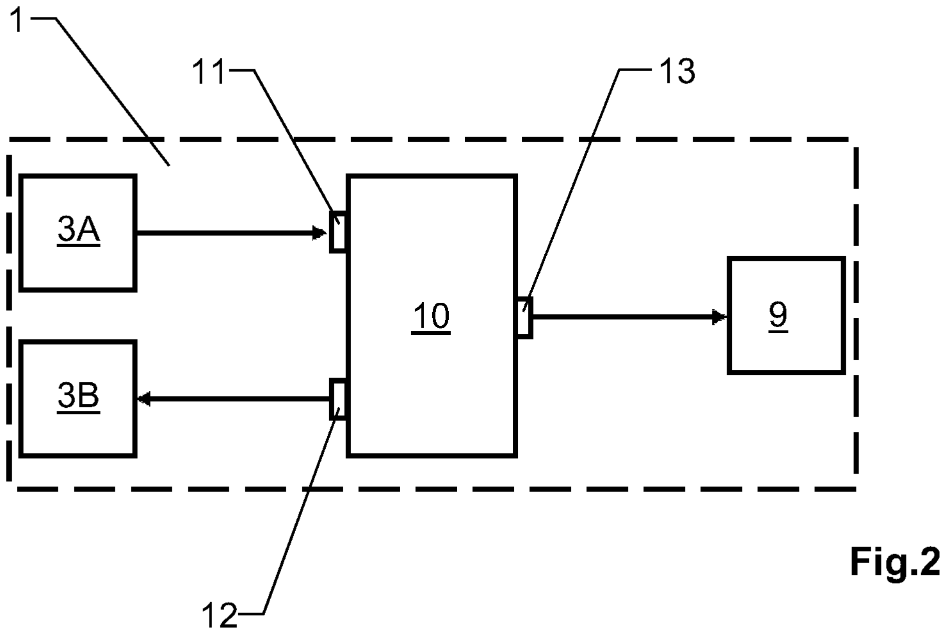
FIG. 2: shows a schematic illustration of an exemplary internal connection of the two external plug-in locations, the internal ethernet output interface and the distributor component.

FIG. 2 shows a schematic illustration of the ethernet device connector built-in module 1 from FIG. 1 and an exemplary internal connection of the two external plug-in locations 3A, 3B, the ethernet contact interface 9 of the printed circuit board and the distributor component 10.

One of the two external plug-in locations, also referred to as input plug-in location 3A, is connected in the interior of the module to a signal input 11 of the distributor component 10. A first signal output 12 of the distributor component 10, which differs from the signal input 11, is connected in the interior of the module to the other one of the two external plug-in locations, also referred to as output plug-in location 3B, and a further signal output 13 of the distributor component 10, which differs from the signal input 11 and from the first signal output 12, is connected in the interior of the module to the ethernet contact interface 9 on the printed circuit board.

Figure 3:
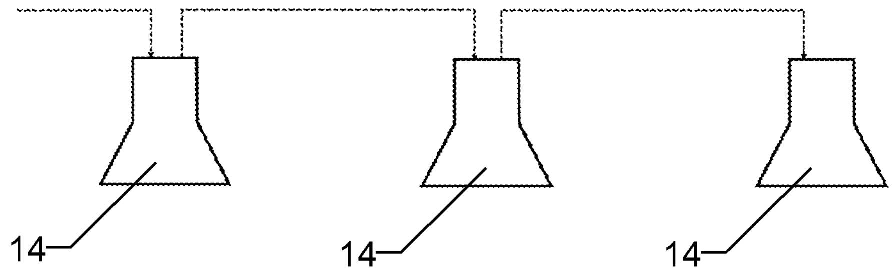
FIG. 3: shows an exemplary illustration of the use of the ethernet device connector built-in module according to the invention for incorporating the apparatus in a chain of a plurality of apparatuses serially connected by ethernet.
Figure 4:
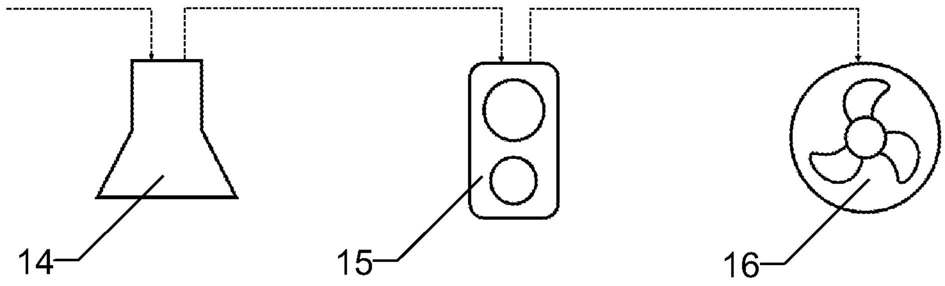
FIG. 4: shows an exemplary illustration of a further use of the ethernet device connector built-in module according to the invention for providing an incorporation of devices from different fields of the four fields of lighting, sound, video and special effects engineering in the same chain of a plurality of apparatuses serially connected by ethernet.

Apparatuses upgraded with an ethernet device connector built-in module according to the present invention are used for example in theatres or concerts and as schematically illustrated in FIG. 3 and FIG. 4 serve to incorporate a multiplicity of devices in a chain of devices serially connected by ethernet.

FIG. 3 shows an embodiment wherein the ethernet device connector built-in module provides connectivity for forming a chain of apparatuses, serially connected by ethernet, from the same field of the four fields of lighting, sound, video and special effects engineering, in this case a chain of illumination devices 14 for example. The ethernet-based construction of the ethernet device connector built-in module in this case allows serial control of a multiplicity of complexly switchable apparatuses, for example stage spotlights or LED panels each with a plurality of switchable configuration options for dim and colour settings.

FIG. 4 shows a further embodiment, wherein the ethernet device connector built-in module provides connectivity between apparatuses from different fields of the four fields of lighting, sound, video and special effects engineering. In the example shown, the ethernet device connector built-in module is configured to provide a chain, connected serially by ethernet, of an illumination unit 14, an audio device 15, in this case a loudspeaker, and a special effects device 16, in this case a wind machine.

Figure 5:
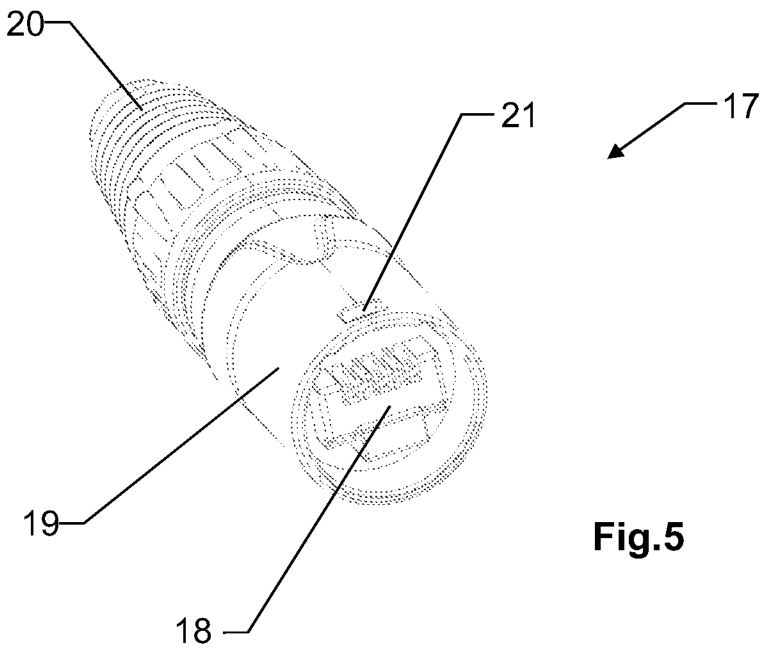
FIG. 5: shows an exemplary embodiment of a cable connector for use with an ethernet device connector built-in module according to the invention.

FIG. 5 shows an exemplary embodiment of a cable connector 17 for use with an ethernet device connector built-in module according to the invention. The cable connector 17 is in the form of a cable plug protector for a pre-assembled RJ45 cable plug 18 in this case and has a housing 19 designed to be plugged into a jack in a plug-in location (see FIG. 6). In the assembled state of the plug arrangement, the RJ45 cable plug 18 is accommodated in the interior of the housing 19 and fixed by means of a tensioning piece. In this case, the tensioning piece has a radially compressible collet, which engages around the cable and securely clamps the cable in the collet in the compressed state. In the assembled state, the housing 19, the tensioning piece and the cable are clamped with respect to one another, with the result that there is a tension-relieving effect on the cores of the cable.

At the back end of the housing 19, which is to say on the side toward the cable, a so-called bend protection 20 is additionally attached and stabilizes the cable introduced into the cable connector 17, with the result that the risk of the cable kinking is minimized.

Further, the housing 19 typically comprises a part of a locking mechanism for preventing the cable connector 17 from inadvertently being removed from the plug-in location. In the example shown, the housing 19 comprises a snap catch mating piece or a spring catch mating piece 21 to this end, for detachably connecting the cable connector 17 from the plug-in location. By way of example, for fixation purposes, a spring catch of the plug-in location on the external side of the housing 19 engages in the depression provided by the snap or spring catch mating piece 21. Preferably, the snap or spring catch mating piece or a recess provided otherwise for an undercut is arranged on the top side of the cable connector.

A known example of such a cable connector for a robust, lockable connection to a device connector is the plug arrangement, made available by Neutrik Group under the trade name NE8MC, for a cable plug protector for pre-assembled RJ45 cable plugs.

Figure 6:
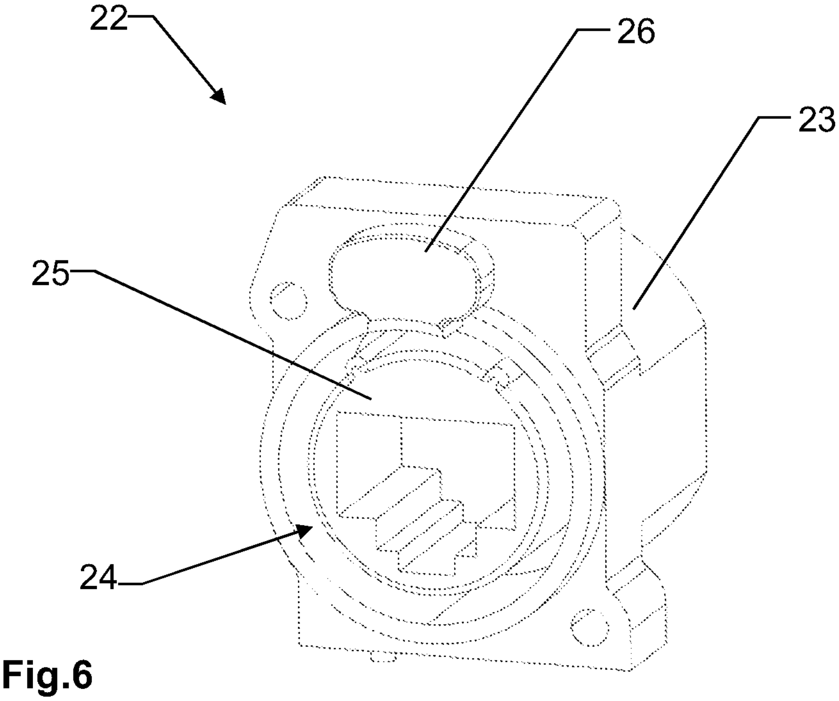
FIG. 6: shows an exemplary embodiment of a plug-in location for use as one of the two external plug-in locations of the ethernet device connector built-in module according to the invention.

FIG. 6 shows an exemplary embodiment of a single device connector 22 which essentially has the same features as the respective plug-in locations 3A, 3B of the double device connector within the meaning of the present invention. The device connector comprises a housing 23 with a plug-in opening 24 for a complementary cable connector (see FIG. 5). The jack 25, here a pre-assembled RJ45 jack for example, is arranged in the housing 23, with the housing 23 surrounding the jack 25 at a distance in a front portion, which is to say on the side from which the cable connector is brought to the plug-in opening 24. Further, an actuation element 26 of a locking mechanism for preventing an inadvertent removal of the cable connector plugged into the device connector 22 is arranged on the housing 23.

By way of example, the actuation element 26 unlocks a locking arm that is pre-tensioned in a closed position and which, for the purpose of locking the cable connector, engages in a catch mating piece (see FIG. 5) arranged on the cable connector. For example, with an operating lug, the actuation element 26 protrudes forwardly beyond the plug-in-side end of the housing 23 so that it can be easily reached and actuated by the user. Preferably, the actuation element 26 (and typically the closing mechanism interacting therewith) are arranged on the top side of the device connector 22.

Figure 7:
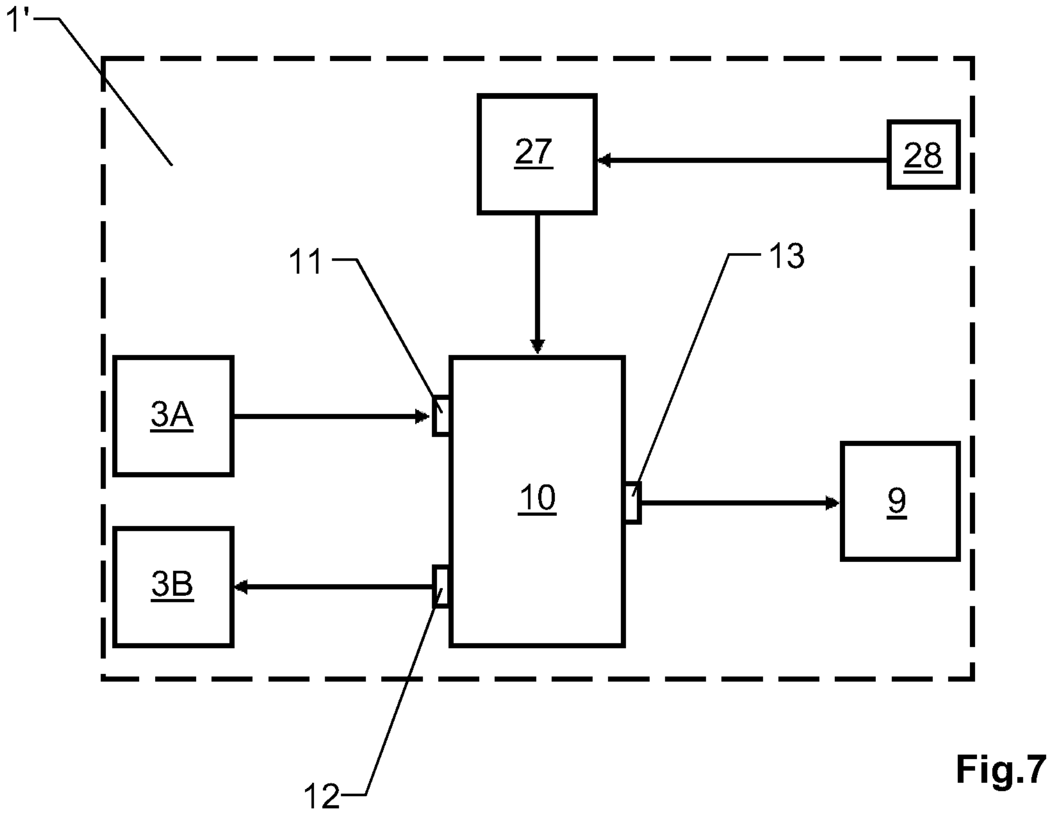
FIG. 7: shows a schematic illustration of a circuit of a power supply unit for supplying power to the distributor component according to the invention, by means of a current connector interface which is connected to the power supply unit and serves to connect an external power supply.
Figure 8:
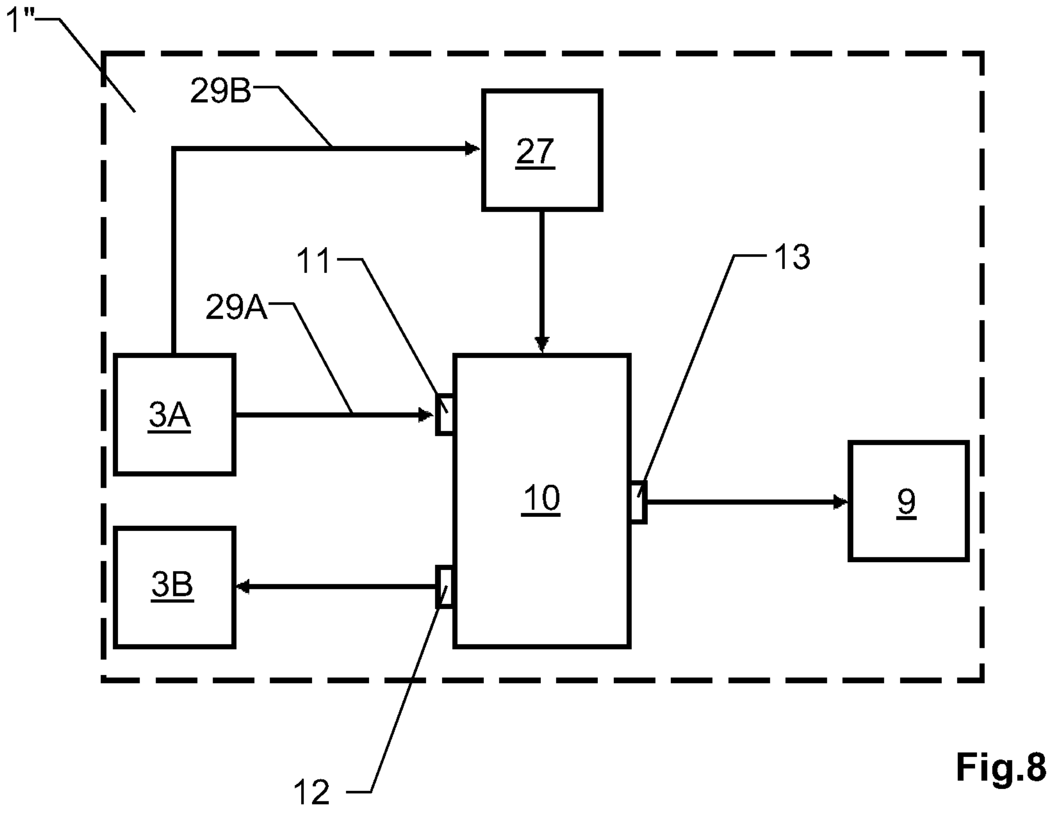
FIG. 8: shows a schematic illustration of a further circuit of a power supply unit for supplying power to the distributor component according to the invention, wherein an input signal supplied via the input plug-in location is split into a data signal component and into a power supply signal component.

FIGS. 7 and 8 show schematic illustrations of two possible circuits of a power supply unit 27 for supplying the distributor component with power, wherein the two external plug-in locations 3A, 3B, the ethernet contact interface 9 on the printed circuit board and the distributor component are arranged like in FIG. 2.

In the embodiment depicted in FIG. 7, the ethernet device connector built-in module 1' comprises a separate current connector interface 28 connected to the power supply unit 27 and serving to connect to an external power supply for supplying the power supply unit 27 with a current input signal. By way of example, the apparatus to be equipped with the ethernet device connector built-in module 1' comprises a dedicated power supply and the current connector interface 28 is connected to a current output of the apparatus located in the interior of the apparatus. In another embodiment, the current connector interface 28 is for example accessible from the outside—when the ethernet device connector built-in module 1' is in the apparatus in the built-in state—and therefore also provides a current connection option independent of the apparatus.

In the embodiment of the ethernet device connector built-in module 1" depicted in FIG. 8, the input plug-in location 3A is connected internally in the module to the signal input 11 of the distributor component and to the power supply unit 27. An input signal supplied by the input plug-in location 3A is split into a data signal component 29A and into a power supply signal component 29B, with the power supply signal 29B being supplied to the power supply unit 27 and being used by the latter to supply power to the distributor component 10.

Figure 9:
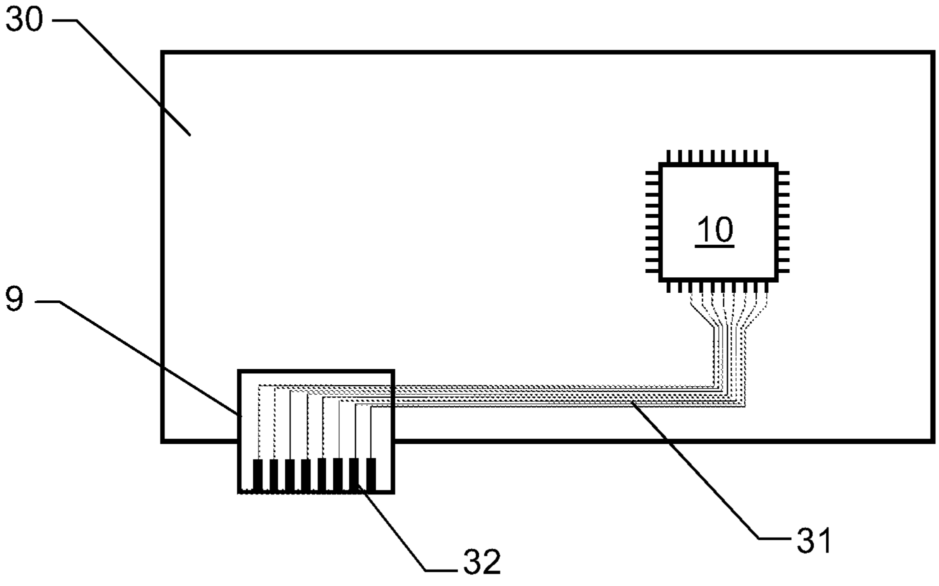
FIG. 9: shows a schematic arrangement of the distributor component on a printed circuit board of the ethernet device connector built-in module according to the invention.

FIG. 9 schematically shows an arrangement of the distributor component 10 on a printed circuit board 30 of the ethernet device connector built-in module according to the invention, wherein the distributor component 10 is connected via conductor tracks 31 of the printed circuit board 30 to the ethernet contact interface 9, which provides mechanically contactable contacts 32, or contacts 32 contactable by soldering, for the connection, on the interior of the apparatus, of the printed circuit board 30 to control electronics of the apparatus. In the example shown, the contacts 32 of the ethernet contact interface 9 have rudimentary form as contacts for ("manual") establishment of a mechanical or soldered connection. In contrast to the thin conductor tracks 31 with a thickness of a few micrometres, the contacts 32 for example have a rectangular shape of at least 2×4 mm.

In further embodiments (not shown), the ethernet contact interface 9 is configured so that the contacts 32 are provided by an RJ45 or SPE plug connected to the conductor tracks 31. Alternatively, the ethernet contact interface 9 is connected via a cable to a PCB plug-in module for plugging-into a printed circuit board of the apparatus, or the printed circuit board 10 of the ethernet device connector built-in module is itself designed as a plug-in module to be plugged into the printed circuit board of the apparatus (e.g., a main PCB of the apparatus).

It is understood that these depicted figures only schematically display possible exemplary embodiments. The various approaches can likewise be connected with one another and with methods from the prior art.

The invention claimed is:

1. An ethernet device connector built-in module for a controllable apparatus for at least one of lighting, sound, video or special effects, the ethernet connector built-in module being configured to be installed into the apparatus as a pre-manufactured physical component, the ethernet connector built-in module comprising:

- a fastening provision for providing an installation of the ethernet device connector built-in module on a housing of the apparatus;
- a double device connector having two external plug-in locations provided by a common flange element and each external plug-in location serving-when the ethernet device connector built-in module is in an installed state in the apparatus—to plug in an ethernet cable connector in order to incorporate the apparatus in a chain of a plurality of apparatuses serially connected by ethernet, a distributor component arranged on a printed circuit board of the ethernet device connector built-in module and configured to distribute a data signal supplied by one of the two external plug-in locations to the other one of the two external plug-in locations and to an ethernet contact interface on the printed circuit board, with the distributor component being connected via conductor tracks on the printed circuit board to the ethernet contact interface and the ethernet contact interface having mechanically contactable contacts, or contacts contactable by soldering, that provide a connection, in an interior of the apparatus, of the printed circuit board to control electronics of the apparatus for controlling the apparatus.

2. The ethernet device connector built-in module according to claim 1, wherein the external plug-in locations, the ethernet contact interface on the printed circuit board and the distributor component are configured for operation according to PoE or PoDL technology.

3. The ethernet device connector built-in module according to claim 1, wherein the external plug-in locations, the ethernet contact interface on the printed circuit board and the distributor component are configured for operation according to one of IEEE standards 802.3.

4. The ethernet device connector built-in module according claim 1, wherein, the external plug-in locations, the ethernet contact interface on the printed circuit board and the distributor component are configured for operation according to an ethernet protocol which provides for a control of different types of apparatuses.

5. The ethernet device connector built-in module according to claim 4, wherein one of the different types is a first type of apparatus from one of four fields of lighting, sound, video and special effects engineering and a further type of the different types is a second type of apparatus from one field of the four fields of lighting, sound, video and special effects engineering which differs from the first field.

6. The ethernet device connector built-in module according to claim 1, wherein the external plug-in locations each comprise an RJ45 or SPE jack.

7. The ethernet device connector built-in module according to claim 1, wherein the external plug-in locations are each configured to establish a precisely fitting mechanically lockable plug-in connection with a respective cable connector which is adapted to the plug-in location as a mating piece and insertable into a plug-in opening in a housing of the respective plug-in location, with the plug-in locations each having a jack arranged in the respective housing, with a front portion of the housing—a portion facing a side from which the cable connector is bringable to the respective plug-in opening—surrounds at least one portion of the jack at a distance.

8. The ethernet device connector built-in module according to claim 1, wherein the ethernet contact interface on the printed circuit board comprises an RJ45 or SPE plug.

9. The ethernet device connector built-in module according to claim 1, wherein the printed circuit board is configured to be plugged into a control unit of the apparatus and is connected to the external plug-in locations via a cable.

10. The ethernet device connector built-in module according to claim 1, further comprising a PCB plug-in module which is connected to the ethernet contact interface on the printed circuit board via a cable, and is configured to be plugged into a control unit of the apparatus.

11. The ethernet device connector built-in module according to claim 1, further comprising a front side configured to constitute a part of a housing exterior of the housing of the apparatus when the ethernet device connector built-in module is in the installed state in the apparatus, with a respective plug-in opening for receiving a cable connector that is insertable into the respective external plug-in location being arranged at the front side for each of the two external plug-in locations.

12. The ethernet device connector built-in module according claim 1, further comprising a common mounting plate and further housing parts provided for an arrangement—when the ethernet device connector built-in module is in the installed state in the apparatus—in the interior of the apparatus, with the common mounting plate having the fastening provision for receiving fasteners for fastening the common mounting plate to the housing of the apparatus.

13. The ethernet device connector built-in module according to claim 12, wherein the common flange element of the double device connector is configured to provide the common mounting plate of the ethernet device connector built-in module.

14. The ethernet device connector built-in module according to claim 1, wherein contact elements of one of the two external plug-in locations are connected in the interior of the module to a signal input of the distributor component, a first signal output of the distributor component, which differs from the signal input, is connected in the interior of the module to contact elements of the other one of the two external plug-in locations, and a second signal output of the distributor component, which differs from the signal input and from the first signal output, is connected in the interior of the module to the ethernet contact interface on the printed circuit board.

15. The ethernet device connector built-in module according to claim 14, further comprising a power supply unit connected to the distributor component and configured to receive a current input signal and provide a current output signal for supplying the distributor component with power, wherein at least one of a) the ethernet device connector built-in module further comprises a separate current connector interface connected to the power supply unit and serving to connect to an external power supply for supplying the power supply unit with the current input signal, or b) the external plug-in location for the two external plug-in locations that is connected in the interior of the module to the signal input of the distributor component is further connected to the power supply unit and configured such that an input signal supplied via the one of the two external plug-in locations is split into a data signal component providing data transmission and a power supply signal component providing a power supply of the power supply unit, with the power supply signal component being supplied to the power supply unit and the data signal component being supplied to the signal input of the distributor component.

* * * * *